Aug. 13, 1957　　　G. T. McCLURE　　　2,802,701
FLUID PRESSURE BRAKE APPARATUS
Filed Feb. 8, 1955
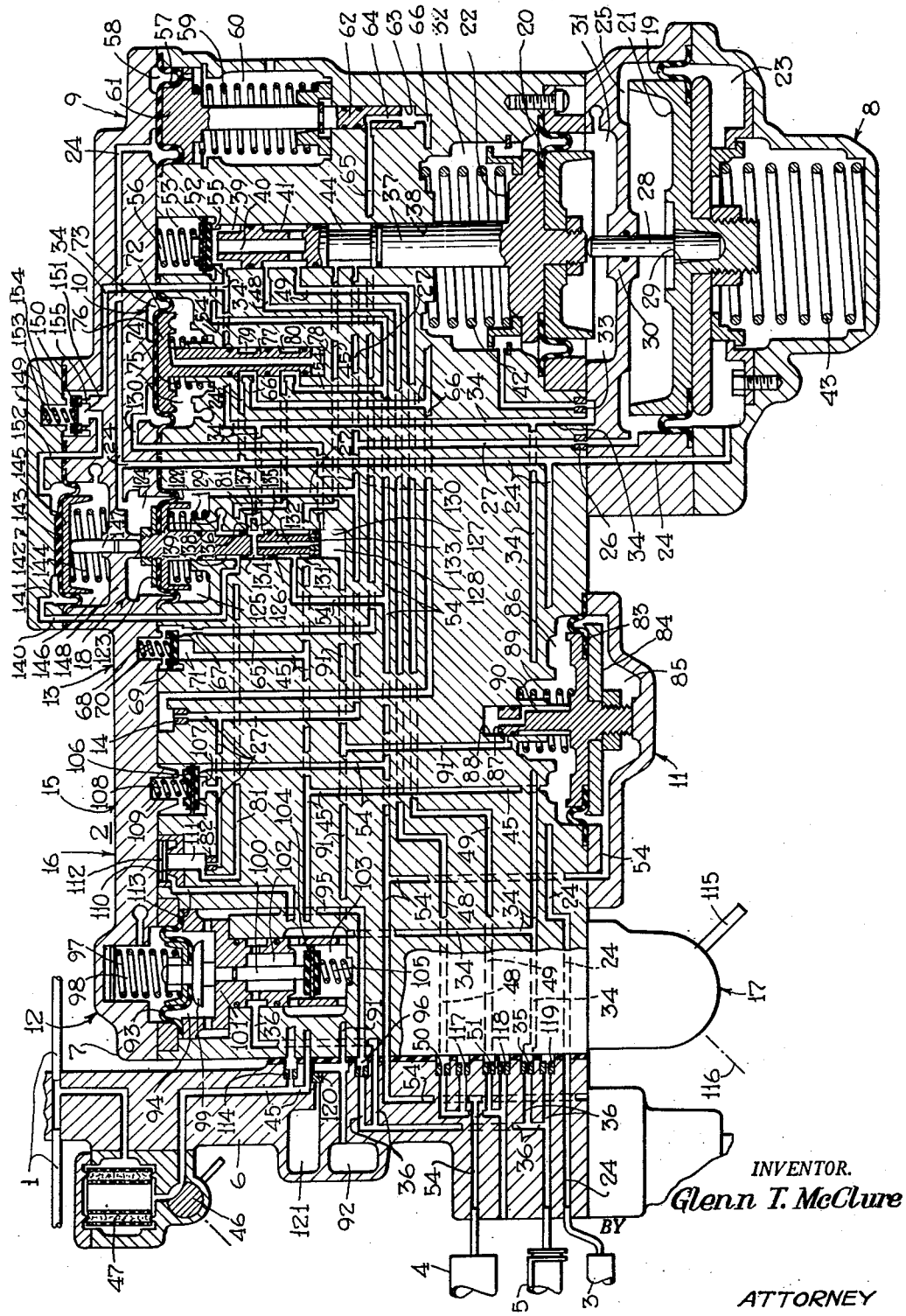
INVENTOR.
*Glenn T. McClure*
BY
ATTORNEY

United States Patent Office 2,802,701
Patented Aug. 13, 1957

2,802,701

FLUID PRESSURE BRAKE APPARATUS

Glenn T. McClure, McKeesport, Pa., assignor to Westinghouse Air Brake Company, Wilmerding, Pa., a corporation of Pennsylvania Application February 8, 1955, Serial No. 486,771

5 Claims. (Cl. 303—39)

This invention relates to fluid pressure brake apparatus and more particularly to the type in which the degree of application and release of brakes on a railway car or the like is controlled according to the extent of reduction and restoration, respectively, in pressure of fluid in a brake pipe relative to a datum pressure in a control reservoir.

Apparatus of the above type frequently comprises on each brake-equipped car a quick service valve device responsive to a slight, such as .7 p. s. i., reduction in brake pipe pressure relative to pressure of fluid in an auxiliary reservoir to move to a quick service position, in which the brake pipe is locally opened to a previously vented quick service volume.

It has heretofore been proposed to provide a reduction insuring or interlock valve device which, at the time the quick service valve device moves to quick service position, is in a normal position in which the quick service volume is opened by way of a so-called continued quick service reduction choke to the corresponding brake cylinder device, so that after initial charging of the quick service volume, brake pipe pressure will continue to be reduced by flow into the brake cylinder device, at the rate controlled by said choke, until brake pipe pressure has been reduced below control reservoir pressure a chosen degree, such as 6 p. s. i., corresponding to that for a preselected degree of minimum brake application, irrespective of the "dead" brake pipe volume on a large number of cars without brake apparatus intervening between the particular car and the next rearward brake-equipped car in the train; and when brake pipe pressure has thus been reduced said chosen degree, the reduction insuring valve device is adapted to move to a cut-out position in which this so-called continued quick service activity is terminated. During release of a brake application, the reduction insuring valve device is adapted to assume a position intermediate its normal and cut-out positions when brake pipe pressure has been restored to within a certain value below control reservoir pressure, for reasons to be explained in subsequent description; and in this intermediate position, the quick service volume is reopened to the brake cylinder device, which is then substantially devoid of fluid under pressure.

It will thus be noted that if, at the time the reduction insuring valve device moves to its intermediate position, the quick service valve device is, for any reason, in its quick service position, such as will occur if auxiliary reservoir pressure sufficiently exceeds brake pipe pressure, the brake pipe will be reopened via the continued quick service reduction choke to the substantially vented brake cylinder device, and thus cause initiation of a quick service reduction in brake pipe pressure, with the result that an undesired minimum brake application can occur. There is a possibility that with apparatus heretofore proposed this undesirable result may occur under conditions hereinafter to be described.

The object of this invention is therefore to provide an improved brake apparatus of the above type embodying novel means for insuring against an undesired quick service reduction in brake pipe pressure during release of a brake application.

Another object is to provide an interlock or fluid pressure loading device for cooperation with an improved reduction insuring valve device to delay movement of the latter device to its intermediate position during a release of brakes until brake pipe pressure has been restored to a value at which it will positively exceed auxiliary reservoir pressure.

According to these objects, the improved fluid pressure brake apparatus comprises an improved reduction insuring valve device and, in addition, an interlock device that comprises a movable abutment subject opposingly to pressure of fluid in a certain chamber and to action of a bias spring; said chamber preferably being vented to atmosphere by way of said reduction insuring valve device when the latter is in its normal position, and opened to the brake cylinder device by way of said reduction insuring valve device when the latter is in and between its cut-out and intermediate positions. The interlock device is adapted to act through a pusher stem against the reduction insuring valve device to maintain the latter in its cut-out position until brake cylinder pressure in the aforementioned chamber is reduced to a value at which brake pipe pressure will have been restored sufficiently to exceed auxiliary reservoir pressure; as a result, the quick service valve device will be moved out of its quick service position before the reduction insuring valve device moves to its intermediate position, thereby desirably preventing the difficulty above described.

The improved brake apparatus also preferably comprises an interlock check valve which permits release of fluid under pressure from the aforementioned chamber to the brake cylinder device, while preventing flow in the reverse direction, for thereby assuring that pressure in said chamber will reduce at the same rate as brake cylinder pressure during a release of brakes.

Other objects and advantages will become apparent from the following more detailed description of the invention and from the accompanying drawing, wherein the single figure is a diagrammatic view of a brake apparatus embodying the invention.

*Description*

Since many of the components of the improved brake apparatus may be generally similar in structure and in operation with the type shown and described in the copending application of Earle S. Cook and Glenn T. McClure, Serial No. 459,368, filed September 30, 1954, and assigned to the assignee of the present application, the following description has been abbreviated insofar as consistent with a clear understanding of the present invention; and only such structure as relates to the novel features of the present invention will hereinafter be described in detail.

As shown in the drawing, the improved brake apparatus comprises the usual brake pipe 1, which is adapted to extend through the train, and in which the pressure of fluid is adapted to be varied in the well-known manner by manual operation of the usual engineer's automatic brake valve device (not shown) provided on the locomotive.

A brake controlling valve device 2 is provided on each brake-equipped car of the train. Each such valve device 2 is adapted to respond to a chosen reduction in pressure in the brake pipe 1 relative to that in a control reservoir 3, for supplying fluid under pressure from an auxiliary reservoir 4 to a brake cylinder device 5 for thereby providing in the latter device fluid at a pressure corresponding to said chosen reduction in brake pipe pressure and thus effecting a corresponding degree of brake application on a particular car. Each valve device 2 is also adapted to respond to any degree of increase in pressure in the brake pipe 1 relative to that in the control reservoir 3 to release fluid under pressure to a proportionate degree from the brake cylinder device 5 and, after said brake cylinder device is devoid of fluid under pressure, open the auxiliary reservoir 4 and control reservoir 3 to the brake pipe for permitting equalization of fluid pressures in said reservoirs with brake pipe pressure in the usual manner.

The brake controlling valve device 2 comprises a pipe bracket 6, to which the brake pipe 1, control reservoir 3, auxiliary reservoir 4, and the brake cylinder device 5 are adapted to be connected; and on one face of said bracket is mounted a sectionalized casing 7. Formed within, and in part defined by, the various sections of the casing 7 are a service valve device 8, a charging cut-off valve device 9, a charging valve device 10, a quick service valve device 11, a brake cylinder inshot valve device 12, a control reservoir charging check valve device 13, a control reservoir combined slow charging and overcharge dissipation choke 14, an auxiliary reservoir charging check valve device 15, an auxiliary reservoir overcharge dissipation check valve device 16, a service selector valve device 17, and a quick service reduction insuring valve device 18.

The service valve device 8 may, for sake of illustration, be of the type comprising, briefly, two coaxially arranged, spaced apart, annular, flexible diaphragms 19, 20 which are cooperably, though not positively, connected to each other so as to form a diaphragm stack, as will be understood from subsequent description. The diaphragms 19, 20 are suitably clamped adjacent their outer peripheral edges between sections of the casing 7 and adjacent their inner edges between diaphragm follower assemblages 21, 22, respectively.

The diaphragm 19 is subject at its under side, as viewed in the drawing, to pressure of fluid in a chamber 23, which is constantly open to the control reservoir 3 by way of a passage 24, and said diaphragm is subject at the opposite side to pressure of fluid in a chamber 25 that is constantly open, by way of a stabilizing choke 26, to a passage 27.

Coaxially arranged with the diaphragms 19, 20 is a cylindrical pusher stem 28, that is accommodated at one end in a recess 29 in the follower assemblage 21 and projects through the chamber 25, thence through a casing partition 30 into an atmospheric chamber 31, and engages at its opposite end the under side, as viewed in the drawing, of the follower assemblage 22; said stem 28, intermediate its ends, having sealing, slidably guided engagement with the wall of an aligned bore through said casing partition. At the side of the diaphragm 20 opposite the chamber 31 is a chamber 32 that is constantly open to the brake cylinder device 5 by way of the usual stabilizing choke 33, a passage 34, a brake cylinder application choke 35, and a passage 36. Preferably formed integrally with one of the parts of the follower assemblage 22 is a cylindrical slide valve 37, which projects through the chamber 32 and has sealing, slidably guided engagement with the wall of an aligned bore 38 in the casing. Adjacent its projecting end, the slide valve 37 is of reduced diameter so as to define, in cooperation with the surrounding bore 38, an annular chamber 39, and extending inwardly from said projecting end is an axially arranged, bore-like opening 40 that is constantly open via radial apertures to an elongated annular cavity 41 which is formed in said slide valve intermediate its ends.

When the brake cylinder device 5 is devoid of fluid under pressure, a helical regulating spring 42 in chamber 32 acts on the follower assemblage 22 for urging the diaphragm stack to the position in which it is shown in the drawing and in which position the follower assemblage 21 operatively engages, but does not compress, the usual caged helical spring 43 in the chamber 23. Under this condition, the slide valve 37 is adapted to assume a brake release position, in which an elongated annular cavity 44 therein opens a branch of the passage 27 to a brake pipe passage 45 that is constantly open to the brake pipe 1 by way of the usual brake pipe cut-out cock 46 and air strainer 47, said cock being provided to permit the brake pipe 1 to be closed off from the brake controlling valve device 2 for cutting the latter out of operation, if and when such is desired. And also, with the slide valve 37 in its brake release position, the cavity 41 is in registry with two brake cylinder release passages 48, 49 having respective release chokes 50, 51, such that the brake cylinder device 5 is open to atmosphere by way of a branch of the passage 34, the chamber 39, bore-like opening 40, cavity 41 and both said release passages 48, 49. And also, with the slide valve 37 in brake release position, the projecting end of said slide valve is out of engagement with a poppet-type valve 52 that controls fluid pressure communication between the chamber 39 and a chamber 53 that is constantly open to the auxiliary reservoir 4 by way of a passage 54; and said valve 52 is thus held seated against an annular valve seat 55 by the combined effects of auxiliary reservoir pressure and action of a helical bias spring 56 in said chamber 53, for preventing such communication.

When brake pipe pressure, as noted in the chamber 25 by way of the slide valve cavity 44 and passage 27, is reduced more than about 3 p. s. i. (as determined primarily by the selected value of spring 42) below control reservoir pressure in the chamber 23, the diaphragm stack is adapted to be deflected upwardly, as viewed in the drawing, for thereby shifting the slide valve 37 to a brake application position. With the slide valve 37 in this position, the cavity 44 maintains the passage 27 connected to the brake pipe passage 45, but the projecting end of said slide valve abuttingly engages the poppet valve 52 and holds the latter unseated against resistance of the spring 56, for thereby enabling fluid under pressure to flow from the auxiliary reservoir 4 via the passage 54, chamber 53, chamber 39 and passage 34 to the brake cylinder device 5; it being noted that the spring-loaded valve 52 sealingly engages the projecting end of said slide valve for preventing leakage of fluid under pressure to atmosphere via the opening 40, cavity 41 and release passage 48.

When brake cylinder pressure, as noted in the chamber 32, has increased to a value corresponding to the selected degree of reduction in brake pipe pressure, as noted in the chamber 25, the combined effect on the diaphragm stack of fluid pressures in these chambers 32, 25, assisted by action of the spring 42, is adapted to overcome the opposing effect of control reservoir pressure in the chamber 23 and cause the diaphragm stack to deflect in the direction of the latter chamber for shifting the slide valve 37 to a lap position, which is intermediate its brake application and brake release positions. With the slide valve 37 in lap position, the valve 52 will be seated and the projecting end of said slide valve will sealingly abut said valve 52, with the result that both the auxiliary reservoir passage 54 and the brake cylinder release passages 48, 49 will be closed off from the passage 34 that leads to the brake cylinder device 5; and hence fluid will be bottled up in said brake cylinder device at the desired pressure.

The charging cut-off valve device 9 may comprise, briefly, a flexible diaphragm 57 that is suitably clamped adjacent its outer peripheral edge between sections of the casing and and is subject at one side to pressure of fluid in a pressure chamber 58 that is constantly open to the control reservoir 3 by way of a branch of the passage 24; and said diaphragm is subject at the opposite side to pressure of a helical regulating spring 59 which is arranged in an atmospheric chamber 60 and acts on said diaphragm through the medium of the usual diaphragm follower 61. Preferably formed integrally with the diaphragm follower 61 is a cylindrical slide valve 62 which extends through the chamber 60 and, adjacent its projecting end, has sealing, slidably guided engagement with the wall of an aligned bore 63 in the casing.

When, as during initial charging of the brake apparatus, the pressure of fluid in the control reservoir 3 and hence in the pressure chamber 58 is less than a chosen value, such as 68 p. s. i., the spring 59 is effective to cause the slide valve 62 to assume a cut-in or normal position, in which it is shown in the drawing. In this position, a passageway 64 in the slide valve 62 connects a passage 65 to a passage 66 that is constantly open to the passage 27 by way of the control reservoir combined charging and dissipation choke 14; said passage 66 being adapted to be opened to the control reservoir 3 by way of the charging valve device 10, under a certain condition to be described presently. The passage 65 is constantly open via a so-called control reservoir fast charging control choke 67 to a chamber 68 at one side of a preferably disc-shaped check valve 69 of the control reservoir charging check valve device 13; said check valve 69 being biased to a seated position by a spring 70 in the chamber 68, against opposition of brake pipe pressure in a chamber 71 that is constantly open to the brake pipe passage 45. Hence the check valve 69 prevents backflow of fluid under pressure from the control reservoir 3 into the brake pipe 1 via the passages 66, 65, but permits flow in the reverse direction, as will be more clearly understood from subsequent description.

When control reservoir pressure in chamber 58 of the charging cut-off valve device 9 exceeds the aforementioned chosen value, illustratively assumed as 68 p. s. i., the diaphragm 57 is adapted to deflect against resistance of the spring 59 for shifting the slide valve 62 to a cut-off position in which the passages 65, 66 are disconnected from each other, for thereby terminating fast charging of the control reservoir 3 by way of said passages; however, charging of said control reservoir may be thereafter effected at a more restricted rate by way of the charging valve device 10, in the manner now to be described.

The charging valve device 10 may comprise, briefly, a flexible diaphragm 72 that is suitably clamped adjacent its outer peripheral edge between sections of the casing and is subjpect at one side to pressure of fluid in a chamber 73 and at the opposite side to pressure of a helical bias spring 74 that is arranged in an atmospheric chamber 75 and acts on said diaphragm through the medium of the usual diaphragm follower 76. Preferably formed integrally with the diaphragm follower 76 is a cylindrical slide valve 77 which extends through the chamber 75 and, adjacent its projecting end, has sealing, slidably guided engagement with the wall of an aligned bore 78 in the casing.

When the chamber 73 is substantially devoid of fluid under pressure, the spring 74 is effective to cause the slide valve 77 to assume a charging position, in which it is shown in the drawing. In this position, an elongated annular cavity 79 formed in the slide valve 77 connects a branch of the passage 66 to a branch of the control reservoir passage 24; and an elongated annular cavity 80 also formed in said slide valve connects a passage 81 to a branch of the auxiliary reservoir passage 54; said passage 81 being constantly open to the passage 27 by way of the usual auxiliary reservoir slow charging control choke 82.

When fluid under pressure is supplied to the chamber 73, in the manner to be described subsequently, the diaphragm 72 is adapted to deflect against the relatively light resistance of the spring 74, for shifting the slide valve 77 to a cut-off position. In this position, the cavities 79, 80 are so disposed as to disconnect the passage 24 from the passage 66 and also disconnect the passage 81 from the passage 54, respectively, for thereby preventing equalization of pressures of fluid in the control reservoir 3 and in the auxiliary reservoir 4 with brake pipe pressure, as will be more fully understood from subsequent description.

The quick service valve device 11 may comprise, briefly, an annular, flexible diaphragm 83 that is suitably clamped adjacent its outer peripheral edge between sections of the casing and adjacent its inner edge between portions of a follower assemblage 84. The diaphragm 83 is subject at one side to pressure of fluid in a chamber 85 that is constantly open to the auxiliary reservoir 4 by way of a branch of the passage 54; and is subject at the opposite side to pressure of fluid in a chamber 86 that is constantly open to the brake pipe 1 by way of a branch of the brake pipe passage 45. Preferably formed integrally with one of the parts of the follower assemblage 84 is a cylindrical slide valve 87 that extends through the chamber 86 and, adjacent its projecting end, has sealing, slidably guided engagement with the wall of an aligned bore 88 in the casing.

When auxiliary reservoir pressure in chamber 85 is substantially equal to brake pipe pressure in the chamber 86, a helical bias spring 89 in the latter chamber is adapted to cause the slide valve 87 to assume a normal position, in which it is shown in the drawing, and in which position an elongated annular cavity 90 formed in said slide valve is out of registry with a passage 91. When, however, brake pipe pressure in chamber 86 is reduced a slight degree, such as .7 p. s. i., below auxiliary reservoir pressure in chamber 85, the diaphragm 83 is adapted to deflect against resistance of the spring 89 for thereby shifting the slide valve 87 to a quick service position, in which the cavity 90 connects the chamber 86 with the passage 91, so that fluid under pressure can flow from the brake pipe 1 via the passage 45, chamber 86, cavity 90 and passage 91 into a quick service volume 92 for causing a local, quick service reduction in brake pipe pressure; and some of the fluid under pressure thus supplied to the passage 91 will also flow, by way of communications hereinafter to be described, to the chamber 73 of the charging valve device 10 and to the brake cylinder device 5.

The brake cylinder inshot valve device 12 may comprise, briefly, a flexible diaphragm 93 which is suitably clamped adjacent its outer peripheral edge between sections of the casing. The diaphragm 93 is subject at one side to pressure of fluid in a chamber 94 that is constantly open to the brake cylinder device 5 by way of a passage 95, the usual inshot baffle choke 96, and a branch of the passage 36; and said diaphragm is subject at the opposite side to action of a helical regulating spring 97 in an atmospheric chamber 98. The diaphragm 93 has a diaphragm follower assemblage 99, a depending part of which is adapted to abuttingly engage a coaxially arranged, cylindrical pusher stem 100 that has sealing, slidably guided engagement with the wall of an aligned bore through a casing partition 101 separating the chamber 94 from a chamber 102 that has unrestricted communication with the brake cylinder device 5 by way of a branch of the passage 36. For controlling fluid pressure communication between the chamber 102 and a chamber 103 that is constantly open to a branch of the passage 34, there is provided a poppet-type inshot valve 104 which is urged to a seated position by a helical bias spring 105 in the chamber 103, for preventing such communication.

When brake cylinder pressure in the chamber 94 is below a chosen value, such as 9 p. s. i., the spring 97 is adapted to urge the diaphragm 93 to a normal position, in which it is shown in the drawing, and in which the diaphragm follower assemblage 99 acts through the medium of the pusher stem 100 to hold the inshot valve 104 unseated against resistance of the spring 105, for thereby opening the chamber 103 to the chamber 102 so that fluid under pressure from the auxiliary reservoir 4 may be supplied to the brake cylinder device 5 at a rapid rate and in by-pass of the application choke 35, by way of the passage 34, chamber 103, past the unseated valve 104, and thence via the chamber 102 and brake cylinder passage 36, for rapidly taking up slack in the brake rigging, and, if preferred, as in some European countries, applying brakes to a preselected minimum degree.

When, however, the brake cylinder pressure as noted in the chamber 94 exceeds the aforementioned chosen value, the diaphragm 93 is adapted to deflect against resistance of the spring 97 and permit the spring 105 to positively seat the inshot valve 104; whereupon further supply of fluid under pressure from the auxiliary reservoir 4 to the brake cylinder device 5 will be solely by way of, and at the rate controlled by, the brake cylinder application choke 35.

The auxiliary reservoir charging check valve device 15 preferably comprises a disc-shaped check valve 106 which is subject at one side to pressure of fluid in a chamber 107 that is constantly open to a branch of the passage 27, and is subject at the opposite side to pressure of fluid in a chamber 108 that is constantly open to a branch of the passage 54. A helical bias spring 109 in the chamber 108 urges the check valve 106 to a seated position, in which it is shown in the drawing, for preventing backflow of fluid under pressure from the passage 54 into the passage 27, but permitting flow in the reverse direction. The spring 109 is preferably of such value as to normally permit charging of the auxiliary reservoir 4 from the brake pipe 1 if and when auxiliary reservoir pressure tends to drop more than 1.7 p. s. i. below brake pipe pressure; it being noted that the brake pipe 1 is opened to the passage 27 by way of the passage 45 and cavity 44 of the service slide valve 37, except under a condition not pertinent to the present invention.

The auxiliary reservoir overcharge check valve device 16 preferably comprises a disc-shaped check valve 110 that is subject at its under side, as viewed in the drawing, to pressure of fluid in a chamber 111 that is constantly open to the passage 81; said check valve being subject at the opposite side to pressure of fluid in a chamber 112 which is constantly open by way of a passage 113 and the usual auxiliary reservoir overcharge dissipation choke 114 to a branch of the brake pipe passage 45. The check valve 110 is adapted to seat against an annular valve seat rib, encircling the chamber 111, so long as brake pipe pressure in chamber 112 exceeds the value of pressure in the passage 81, which passage 81 is opened to the auxiliary reservoir passage 54 by way of the cavity 80 of the charging valve device 10, when the slide valve 77 of the latter device is in its previously defined charging position.

The service selector valve device 17 comprises the usual valve means (not shown) manually operable by movement of a handle 115 to a freight position, in which it is shown in the drawing, for connecting the passages 48, 49 and 34 to the chokes 50, 51 and 35, respectively, as shown in said drawing, for conditioning the brake apparatus for use in freight service. The handle 115 is movable to a passenger position, indicated by the dot-and-dash line 116, for opening the passage 48 to the choke 50 and also an additional, parallel-arranged choke 117; opening the passage 49 to the choke 51 and also an additional parallel-arranged choke 118; and also opening the passage 34 to the choke 35 and an additional parallel-arranged choke 119; said additional chokes being provided to augment the rates of flow of fluid under pressure through the respective passages to satisfy brake cylinder release conditions prescribed, as by the U. I. C. in Europe, for passenger service operation.

Since the improved brake apparatus is thus shown in the drawing as being conditioned for freight service, a plug fitting 120 seals off from the quick service passage 91 a quick service volume 121; but said plug fitting is removed when the apparatus is employed in passenger service, so that the capacity of the volume 121 may augment that of the quick service volume 92.

The valve device 18, herein referred to as the quick service reduction insuring valve device, is somewhat similar to the interlock valve device disclosed in the aforementioned copending application; in the present application, however, the terminology has been changed in order to more clearly distinguish the valve device 18 from the novel structure hereinafter to be described.

The quick service reduction insuring valve device 18 may, for sake of illustration, comprise an annular, flexible diaphragm 122 which is suitably clamped adjacent its outer peripheral edge between sections of the casing and adjacent its inner edge between parts of a diaphragm follower assemblage 123. The diaphragm 122 is subject at one side to pressure of fluid in a chamber 124 that is constantly open to the control reservoir 3 by way of a branch of the passage 24; and said diaphragm is subject at the opposite side to pressure of fluid in a chamber 125 that is constantly open to a branch of the passage 27, which latter passage, as already noted, is open by way of the service slide valve 37 to the brake pipe passage 45, except under a condition not pertinent to the present invention. Preferably formed integrally with one of the parts of the diaphragm follower assemblage 123 is a coaxially arranged, cylindrical slide valve 126 that extends through the chamber 125 and adjacent its projecting end has sealing, slidably guided engagement with the wall of an aligned bore 127 in the casing. The base and adjacent wall of the bore 127 cooperate with the projecting end of the slide valve 126 to define a chamber 128 that is constantly open to a branch of the quick service passage 91.

A helical regulating spring 129 disposed in the chamber 125 acts on the diaphragm 122 through the medium of the follower assemblage 123 for urging the slide valve 126 to a normal position, in which it is shown in the drawing, and which position is defined by engagement of a part of said assemblage 123 with the adjacent end wall of the chamber 124; it being noted that this position will be assumed when control reservoir pressure in chamber 124 is substantially equal to brake pipe pressure, as noted in the chamber 125.

With the slide valve 126 in normal position, the projecting end of said slide valve uncovers to the chamber 128 a passage 130 that leads to the chamber 73 of the charging valve device 10; and an elongated annular cavity 131 formed in said slide valve adjacent said projecting end is in registry with a branch of the auxiliary reservoir passage 54 but out of registry with said passage 130; and also the chamber 128, and hence the quick service volume 92 is open to the brake cylinder device 5 by way of a restricted continued quick service reduction communication and a branch of the passage 34. The communication just mentioned is defined in part by an opening 132 that extends axially inward from the projecting end of the slide valve 126; said opening suitably accommodates a choke fitting 133 and is constantly open to an elongated annular cavity 134 formed in said slide valve intermediate the cavity 131 and the diaphragm 122.

The slide valve 126 also has a quick service cut-out position defined by engagement of a depending annular rim of the follower assemblage 123 with the end wall of chamber 125. In this position, the cavity 131 connects the last mentioned branch of the auxiliary reservoir passage 54 to the passage 130 and hence to the charging valve chamber 73, so that pressure of fluid in the auxiliary reservoir 4 will hold the slide valve 77 of the charging valve device 10 in its previously defined cut-off position; and the cavity 134 of the aforementioned quick service reduction communication is out of registry with the passage 34 for preventing flow of fluid under pressure from the quick service volume 92 into the brake cylinder device 5.

Assume now that the apparatus as thus far described, which is substantially identical with that disclosed in the aforementioned copending application, is installed on a car of a freight train and that the brake pipe 1 is charged to normal operating value; the reader being referred to said copending application for detailed explanation of the manner in which said apparatus is initially charged, since the present invention does not relate to, or even affect, initial charging.

With the brake pipe 1 charged to normal operating value, brake pipe pressure in the chamber 25 and the spring 42 in chamber 32, acting on the diaphragm stack of the service valve device 8 in opposition to control reservoir pressure in the chamber 23, will cause the slide valve 37 to be maintained in its previously defined brake release position, in which the brake cylinder device 5 is opened to atmosphere by way of the passage 34, opening 40, cavity 41, and release passages 48, 49. With the brake cylinder device 5 devoid of fluid under pressure, the inshot valve 104 of device 12 will be unseated. The quick service valve device 11 will be maintained in its previously defined normal position because the effect on the diaphragm 83 of brake pipe pressure in the chamber 86 and the action of spring 89 will overcome the opposing effect of auxiliary reservoir pressure in chamber 85; and hence the brake pipe passage 45 will be cut off from the quick service volume 92.

Also, with brake pipe pressure at normal operating value, the slide valve 126 of the reduction insuring valve device 18 will be maintained in its previously defined normal position because the combined effect of brake pipe pressure in chamber 125 and action of the spring 129 will overcome the opposing effect on the diaphragm 122 of control reservoir pressure in the chamber 124, and hence the chamber 73 of the charging valve device 10 and also the quick service volume 92 will be opened to the vented brake cylinder device 5 by way of the cavity 134 in slide valve 126 and the passage 34. With the chamber 73 thus vented, the slide valve 77 of the charging valve device 10 will be in its previously defined charging position under action of the spring 74; and hence the brake pipe 1 will be maintained opened to the control reservoir 3 and auxiliary reservoir 4, by way of the respective communications previously described, for permitting equalization of such pressures. However, the slide valve 62 of the charging cut-off valve device 9 will be in its previously defined cut-off position, in which passage 65 is disconnected from passage 66, because control reservoir pressure in chamber 58 will overcome the opposing effect on the diaphragm 57 of the regulating spring 59; and hence the control reservoir fast charging communication, in part defined by the passage 65, slide valve cavity 64, and passage 66, will be closed.

Since the brake apparatus is being used on a car in freight service, the handle 115 of the selector valve device 17 will have been placed in its freight position, in which it is shown in the drawing.

Thus, from the foregoing, it will be noted that all of the components of the brake apparatus as thus far described will be in the respective positions in which they are shown in the drawing, with the exception of the slide valve 62 of the charging cut-off valve device 9, which will be in its cut-off position, as hereinabove noted.

Assume further that the freight train is composed of a large number of cars without brake apparatus intervening between each brake-equipped car and the next rearward brake-equipped car in said train; it being noted that brake apparatus of the subject type is intended for use on trains in Europe, where it is customary to equip with brake apparatus only a percentage of the total cars in a freight train, according to intended operating conditions, and that in order to comply with regulations prescribed, as by the U. I. C., this type of brake apparatus must be capable of operating satisfactorily with as many as twelve to fifteen unbraked cars directly rearward of a single brake-equipped car.

Assume now that the operator desires to effect a minimum application of brakes throughout the train, and that he therefore actuates the aforementioned engineer's automatic brake valve device to a service position for effecting a reduction in brake pipe pressure at the locomotive sufficient to cause the illustratively assumed reduction of .7 p. s. i. in brake pipe pressure on the nearest brake-equipped car, and that he thereupon actuates said brake valve device to a lap position for preventing any further reduction in brake pipe pressure at the locomotive, in the manner well known in the art.

This reduction in brake pipe pressure, as noted in the brake pipe 1 and hence in the brake pipe passage 45 and in chamber 86 of the quick service valve device 11 on the brake-equipped car nearest the locomotive, will promptly cause the corresponding diaphragm 83 to deflect upwardly and shift the quick service slide valve 87 to its quick service position, whereupon fluid under pressure will flow at a substantially unrestricted rate from brake pipe passage 45 through cavity 90 and thence via one branch of the passage 91 into the quick service volume 92 for causing a local, quick service reduction in brake pipe pressure and also flow via another branch of passage 91, the chamber 128 and passage 130 to the chamber 73 for causing the slide valve 77 of the charging valve device 10 to be promptly shifted to its cut-off position, in which the brake pipe is cut off from the control reservoir passage 24 and auxiliary reservoir passage 54, so as to desirably prevent backflow of fluid under pressure from the control and auxiliary reservoirs 3, 4 into the brake pipe. After the quick service volume 92 is thus charged, fluid under pressure will continue to flow from the brake pipe 1 on not only the particular brake-equipped car but also on the adjacent cars without brake apparatus to the brake cylinder device 5 on said particular car via the passage 91, continued quick service reduction choke fitting 133, opening 132, slide valve cavity 134 and passage 34; such flow being at the rate controlled by said choke fitting 133 and referred to in the art as continued quick service activity.

During this reduction in brake pipe pressure, the pressures of fluid in the chamber 25 of the service valve device 8 and in the chamber 125 of the reduction insuring valve device 18 will be correspondingly reduced; this being true because the brake pipe passage 45 is open by way of the cavity 44 in the slide valve 37 of said service valve device to the passage 27, respective branches of which passage 27 lead to said chambers 25, 125.

When brake pipe pressure, as thus noted in chamber 25 of the service valve device 8, has been reduced beyond a chosen degree, such as 3 p. s. i., as determined primarily by the selected value of the regulating spring 42, the diaphragm stack will be deflected by the preponderant effect thereon of control reservoir pressure in chamber 23 which will overcome the combined resistance of reduced brake pipe pressure in chamber 25, action of said spring 42 and action of auxiliary reservoir pressure and the spring 56 on the valve 52; and as a result of such deflection, the slide valve 37 will be shifted to its brake application position, in which the valve 52 is unseated, the opening 40 is sealed by said valve 52, and the slide valve cavity 44 continues to connect the passages 45, 27. With the valve 52 thus unseated, fluid under pressure will flow from the auxiliary reservoir 4 to the brake cylinder device 5 by way of the passage 54, chamber 53, and thence past the unseated valve 52 into the passage 34, whence it will flow at a substantially unrestricted rate via the chamber 103 and past the unseated inshot valve 104 of device 12 into the chamber 102 and thence into the brake cylinder passage 36, substantially in by-pass of the brake cylinder application choke 35; and such unrestricted flow will continue, until the inshot valve 104 is closed by previously described operation of the inshot valve device 12 upon the attainment of the illustratively assumed pressure of 9 p. s. i. in the brake cylinder device 5, whereupon further flow, if any, to the brake cylinder device 5 will be at the restricted rate controlled by the brake cylinder application choke 35.

Meanwhile, as brake pipe pressure is reduced in the brake pipe passage 45, it will be correspondingly reduced in the chamber 125 of the quick service reduction insuring valve device 18, in the manner above explained. It will be noted that the effect on the diaphragm 122 of control reservoir pressure in the chamber 124 is opposed by the combined effect of brake pipe pressure in the chamber 125, brake pipe pressure in the chamber 128 acting over the cross-sectional area of the slide valve 126, and action of the helical regulating spring 129; the spring 129 being of such value that the slide valve 126 will not assume its cut-out position until, by virtue of previously described continued quick service activity, brake pipe pressure has been reduced below control reservoir pressure a chosen degree, such as 6 p. s. i., corresponding to the degree of brake pipe reduction necessary to provide in the brake cylinder device 5 fluid at a pressure, such as 9 p. s. i., corresponding to a selected degree of minimum application of brakes. And as soon as the slide valve 126 attains its cut-out position, the cavity 134 will be closed off from the passage 34 for terminating this continued quick service activity; and cavity 131 will connect the auxiliary reservoir passage 54 to the charging valve chamber 73 so that auxiliary reservoir pressure will maintain the charging slide valve 77 in its cut-off position.

Since the engineer's brake valve device is in lap position, in which fluid under pressure is neither supplied to nor released from the brake at the locomotive, it follows that as soon as continued quick service activity is thus terminated, no further reduction in pressure will occur in the brake pipe 1 on the particular brake-equipped car and hence in the chamber 25 of the service valve device 8 on said car. Since the service valve device 8 operates to provide in the brake cylinder device 5 fluid at a pressure proportional to the degree of brake pipe reduction, in the manner previously explained, it will be apparent that under the assumed condition, i. e., where a minimum application of brakes is sought, the service valve diaphragm stack will deflect and thus shift the slide valve 37 to its previously defined lap position for bottling up fluid under pressure in the brake cylinder device 5, when brake cylinder pressure has attained the illustratively assumed value of about 9 p. s. i. corresponding to the illustratively assumed 6 p. s. i. reduction in brake pipe pressure below control reservoir pressure, as effected by continued quick service activity; it being noted, by way of illustration only, that this assumed relationship between brake cylinder pressure and brake pipe pressure may be obtained where the combined bias on the stack is equivalent to about 3 p. s. i. of brake pipe pressure (of which spring 42 accounts for a pressure equivalent to about 2 p. s. i. of brake pipe pressure, and spring 56 and auxiliary reservoir pressure in chamber 53 are equivalent to about 1 p. s. i. of brake pipe pressure), and diaphragm 19 has an effective area approximately three times that of the diaphragm 20.

It will be understood that as the quick service valve device 11 on the brake-equipped car nearest the locomotive operates to effect a local quick service reduction in brake pipe pressure, the pressure in the brake pipe at the adjacent rearward brake-equipped car will be promptly reduced at least the illustratively assumed .7 p. s. i. sufficient to initiate operation of the quick service valve device 11 on said rearward car, etc., thus causing rapid serial operation of all of the quick service valve devices 11 on the respective cars in the train; and on each brake-equipped car quick service activity will continue after initial charging of the respective quick service volume 92, until brake pipe pressure has been reduced below control reservoir pressure by the aforementioned chosen degree, illustratively assumed as 6 p. s. i.

It should also be noted that during continued quick service activity fluid under pressure will be locally withdrawn from the brake pipe 1 on the particular brake-equipped car and also on the adjacent freight cars without brake apparatus, and such fluid under pressure will be released into the brake cylinder device 5 on said particular car. Although the brake cylinder device 5 on each car is initially open to atmosphere by way of the service slide valve 37 and the brake cylinder release passages 48, 49 and their respective chokes 50, 51 when the apparatus is conditioned for freight service, the flow capacity of these chokes is intentionally limited so as to provide more nearly uniform initiation of a brake release throughout the train and thus prevent undesired run-out of slack on the cars toward the front of the train. Since the combined flow capacity of the chokes 50, 51 is less than that of the continued quick service reduction choke fitting 133, it follows that there will be some buildup of fluid pressure in the brake cylinder device 5 even though the slide valve 37 of the service valve device 8 is initially in its brake release position; and after brake pipe pressure has been reduced the illustratively assumed 3 p. s. i. below control reservoir pressure and causes the slide valve 37 to be shifted to its brake application position, in which the brake cylinder device 5 is cut off from atmosphere and fluid under pressure is supplied to the latter device from the auxiliary reservoir 4, fluid under pressure from the brake pipe on the particular car and also on the adjacent unbraked cars will continue to flow into the brake cylinder device via the choke fitting 133 until brake pipe pressure has been reduced the illustratively assumed 6 p. s. i., and causes the slide valve 126 of the quick service reduction insuring valve device 18 to be shifted to its cut-out position.

If the operator subsequently actuates the engineer's brake valve device for supplying fluid under pressure to the brake pipe at the locomotive for releasing this minimum application of brakes, fluid under pressure will flow from the brake pipe passage 45 on a particular car and via the cavity 44 of the service slide valve 37 to the passage 27; whence it will flow to the chamber 25 of the service valve device 8 for causing the slide valve 37 to be shifted to its brake release position for releasing fluid under pressure from the brake cylinder device 5, and it will also flow to the chamber 125 of the quick service reduction insuring valve device 18 for causing a corresponding buildup in pressure of fluid in the latter chamber.

As brake pipe pressure as noted in chamber 125 is restored to some value within 6 p. s. i. of control reservoir pressure in chamber 124, the combined effect of brake pipe pressure in said chamber 125, pressure in chamber 128 and action of spring 129 will cause the diaphragm 122 to be deflected in the direction of chamber 124, against resistance of control reservoir pressure in the chamber 124, and thereby carry the slide valve 126 to a so-called intermediate position, in which the upper part of the cavity 134 is opened to the passage 34 and the cavity 131 still maintains the auxiliary reservoir passage 54 opened to the passage 130 and hence to the charging valve chamber 73. As soon as the slide valve 126 reaches this position, fluid under pressure will be released from the quick service volume 92 and chamber 128 into the almost vented brake cylinder device 5 via previously described communication including the choke fitting 133 and now unseated inshot valve 104 of device 12, at the rate controlled by said choke fitting. Since the assisting force theretofore exerted on slide valve 126 by fluid pressure in the chamber 128 has thus been lost by venting of said chamber, the slide valve 126 will temporarily remain in its intermediate position until brake pipe pressure in the chamber 125 has increased sufficiently to make up for the loss of such assisting force, whereupon the diaphragm 122 will be deflected upwardly for carrying said slide valve to its normal position, in which the cavity 134 continues to connect the quick service volume 92 to the now vented brake cylinder device 5, while the charging valve chamber 73 is disconnected from the auxiliary reservoir passage 54 and opened by way of the chamber 128 and cavity 134 to the vented brake cylinder device for causing the slide valve 77 of the charging valve device 10 to be shifted to its charging position, in which the brake pipe is reopened to the control reservoir passage 24 and auxiliary reservoir passage 54, as will be understood from previous description.

From the foregoing, it will be noted that during a minimum application of brakes, fluid under pressure will be withdrawn from the brake pipe 1 into the brake cylinder device 5 on a particular car by virtue of previously described continued quick service activity; that in consequence thereof there will be some buildup in pressure in said brake cylinder device; and that this will, in turn, restrict the extent to which fluid under pressure must be supplied from the corresponding auxiliary reservoir 4 for applying brakes and consequently reduce the extent of depletion of auxiliary reservoir pressure.

Although the apparatus has functioned very satisfactorily under most operating conditions, there is a possibility that under the assumed condition, that is, where the operator effects a reduction of the illustratively assumed .7 p. s. i. in brake pipe pressure at the locomotive and relies upon continued quick service activity to reduce the pressure of fluid in the brake pipe on not only the particular brake-equipped car but also on the adjacent unbraked cars the illustratively assumed 6 p. s. i. for effecting a minimum application of brakes on a freight train composed of a large number of such unbraked cars, auxiliary reservoir pressure and hence the pressure in chamber 85 of the corresponding quick service valve device 11 may be somewhat higher than brake pipe pressure and hence higher than the pressure in chamber 86 of said device; and this situation is most likely to occur where, as in France, it has been proposed to use a conventional size auxiliary reservoir but shorten the travel of a brake cylinder piston to overcome a difficulty not pertinent to the present invention. If auxiliary reservoir pressure should, for this or any other reason, be slightly higher than brake pipe pressure, at the time the reduction insuring slide valve 126 is shifted to its intermediate position during release of a brake application, the quick service slide valve 87 will still be in its quick service position; and hence the brake pipe will, at such time, be opened to the brake cylinder device 5 by way of previously described communication, including the brake pipe passage 45, cavity 90 of the quick service slide valve 87, passage 91, choke fitting 133, cavity 134 of the reduction insuring slide valve 126, and the passage 34. In such event, instead of the quick service volume 92 being vented as intended, fluid under pressure will be locally released from the brake pipe into the substantially vented brake cylinder device 5 until brake pipe pressure has been reduced the illustratively assumed 6 p. s. i. below control reservoir pressure and causes the reduction insuring slide valve 126 to be shifted to its cut-out position, when the preselected degree of minimum brake application has been effected. In order to release this undesired brake application, the operator must effect a reduction in brake pipe pressure at the locomotive sufficient to apply brakes to a greater degree at which auxiliary reservoir pressure will be reduced sufficiently relative to brake pipe pressure so that when brake pipe pressure is increased for releasing brakes, it and spring 89 will overcome opposing auxiliary reservoir pressure and cause the quick service slide valve 87 to shift to normal position.

It is therefore desirable to provide an improved brake apparatus embodying means for positively insuring against movement of the reduction insuring slide valve 126 to its intermediate position until, during a release of brakes, brake pipe pressure has been restored to a value at which it is sufficient to assure that the quick service slide valve 87 will have already returned to its normal position.

To this end and according to the invention, the reduction insuring valve device 18 is modified, such that when the slide valve 126 is in its previously defined normal position, the cavity 134 is adapted to be in registry with two parallel-arranged ports 135, 136 which open through the wall of the bore 127 and are constantly open to the passage 34 via a linking passage 137; and an elongated annular cavity 138 formed in said slide valve intermediate the cavity 134 and diaphragm 122 preferably connects to an atmospheric vent port 139 a passage 140 that leads to a chamber 141 of an interlock or fluid pressure loading device 142.

When the slide valve 126 is in its previously defined cut-out position, the cavity 134 will be disconnected from both ports 135, 136; and the cavity 138 will disconnect the passage 140 from the vent port 139 and connect said passage 140 to both ports 135, 136 and hence to the brake cylinder device 5, so that fluid at brake cylinder pressure may be supplied to the chamber 141. When the slide valve 126 is in its previously defined intermediate position, the cavity 138 will disconnect the passage 140 from the vent port 139 and open said passage to the port 136 for maintaining chamber 141 open to the brake cylinder device 5; and cavity 134 will register with port 135 for venting the quick service volume 92.

The interlock device 142 may, for sake of illustration, comprise a flexible diaphragm 143 that is suitably clamped adjacent its outer periphery between sections of the casing and is arranged coaxially with the diaphragm 122 and slide valve 126 of the reduction insuring valve device 18. The diaphragm 143 is subject at one side to pressure of fluid in the chamber 141; and said diaphragm is subject at the opposite side to pressure of a helical spring 144 that acts on said diaphragm through the medium of a coaxially arranged diaphragm follower 145 and is disposed in a chamber 146 which is constantly open to atmosphere by way of a suitable vent port. Arranged coaxially with the diaphragms 122, 143 of the valve devices 18, 142, respectively, is a cylindrical pusher stem 147 that has sealing, slidably guided engagement with the wall of an aligned bore through a casing partition 148 that separates the chamber 146 from the chamber 124.

The spring 144 urges the diaphragm 143 to a normal position, in which it is shown in the drawing, and which position is defined by abutting engagement of the diaphragm with a suitable stop surface formed in the end wall of the chamber 141. With the diaphragm 143 in this position, no thrust is exerted by the diaphragm follower 145 on the pusher stem 147. When, however, fluid under pressure is supplied to the chamber 141 from the brake cylinder device 5 upon movement of the reduction insuring slide valve 126 to its cut-out position, the diaphragm 143 will promptly deflect to a holding position against resistance of the spring 129, said holding position being defined by abutting engagement of a depending portion of the diaphragm follower 145 with a suitable stop surface formed in the end wall of chamber 146. With the diaphragm 143 in holding position, brake cylinder pressure in the chamber 141 acts through the medium of said diaphragm and the follower 145 for causing the pusher stem 147 to abuttingly engage, and exert a thrust force on, the reduction insuring follower assemblage 123, for thereby resisting movement of the slide valve 126 from its cut-out position to its intermediate position.

The improved brake apparatus also preferably comprises an interlock check valve device 149 which may, for sake of illustration, comprise a poppet-type check valve 150 subject at its under side, as viewed in the drawing, to pressure of fluid in a chamber 151 that is constantly open to the chamber 141 by way of a passage 152. The check valve 150 is subject at its upper side to pressure of fluid in a chamber 153 that is constantly open to the brake cylinder device 5 by way of a branch of the passage 34. A helical bias spring 154 in the chamber 153 urges the check valve 150 into sealing engagement with an annular valve seat rib 155 formed by a projecting part of the casing encircling the chamber 151. Hence, the check valve device 149 is arranged to positively assure that pressure in the chamber 142 will reduce at the same rate as, and to substantially the same degree as, brake cylinder pressure; and said check valve device prevents supply of fluid under pressure to the chamber 142 except by way of the cavity 138 in the reduction insuring slide valve 126.

With the improved apparatus, as just described, if it is initially assumed that the brakes have been fully released, the interlock diaphragm 141 and the reduction insuring slide valve 126 will be in their respective previously defined normal positions, in which they are shown in the drawing, it being noted that the interlock chamber 141 is open to atmosphere via the cavity 138 of said reduction insuring slide valve, and that the charging valve chamber 73 and quick service volume 92 are also open to the vented brake cylinder device 5 in the manner already explained.

Assume now that the operator effects a slight reduction in brake pipe pressure at the locomotive for initiating a minimum brake application on a freight train having as many as fifteen cars without brake apparatus directly rearward of a single brake-equipped car, which is a stringent test condition prescribed by the U. I. C. in Europe; and assume further that, as proposed in France, a standard size auxiliary reservoir is used but the brake rigging is adjusted so that brakes will be applied when the piston (not shown) of the brake cylinder device 5 travels considerably less than the normal distance.

Under the conditions just assumed, the improved brake apparatus will operate, in exactly the same manner as earlier described, to initially effect a local, quick service reduction in brake pipe pressure by dumping fluid from the brake pipe into the quick service volume 92. And then, with the reduction insuring slide valve 126 in normal position, in which the interlock chamber 141 is vented via the cavity 138 and the quick service volume 92 is open to the brake cylinder device 5, brake pipe pressure will continue to be reduced by flow to said brake cylinder device at the rate controlled by choke fitting 133, until brake pipe pressure as noted in chamber 125 has been reduced to about the illustrative 6 p. s. i. below control reservoir pressure in the chamber 124; whereupon the diaphragm 122 will deflect and move the slide valve 126 downwardly through its intermediate position to its cut-out position. During such downward movement of the slide valve 126, some fluid under pressure can be admitted from the brake cylinder device 5 to the interlock chamber 141 via slide valve cavity 138 for assisting such movement, if necessary, for instance, to overcome slide valve friction; it being noted, however, that, in any event, no thrust will be exerted on the slide valve 126 through the medium of the pusher stem 147 during such downward movement before the said slide valve attains its intermediate position. Also, the check valve 150 will prevent flow of fluid at brake cylinder pressure to the chamber 141 via the passage 152 to prevent the possibility of such fluid causing premature movement of the slide valve 126 from its normal position toward its cut-out position.

With the reduction insuring slide valve 126 in its cut-out position, continued quick service activity will be terminated and the cavity 131 will maintain the charging valve chamber 73 charged from the auxiliary reservoir passage 54; and also the interlock chamber 141 will be maintained open to the brake cylinder device 5 via cavity 134 and ports 136, 135 so that brake cylinder pressure acting on the interlock diaphragm 143 will exert thrust on said slide valve via the pusher stem 147.

With a minimum brake application thus effected, brake cylinder pressure and hence the pressure in the interlock chamber 141 will be the illustrative 9 p. s. i. corresponding to the brake pipe reduction, illustratively assumed as 6 p. s. i., effected by continued quick service activity; and under the conditions above assumed and for the reasons earlier explained, auxiliary reservoir pressure will be higher than brake pipe pressure and the quick service slide valve 87 will consequently be in its quick service position.

If now the operator effects an increase in brake pipe pressure at the locomotive for releasing this minimum brake application, this increase in brake pipe pressure will be noted on the adjacent brake-equipped car in the quick service valve chamber 86 and also, by way of service slide valve cavity 44 and passage 27, in the chamber 125 of the reduction insuring valve device 18 and in the chamber 25 of the service valve device 8, causing the slide valve 37 of the latter device to be promptly shifted to brake release position for correspondingly releasing fluid under pressure from the brake cylinder device 5 to atmosphere via the unseated inshot valve 104, opening 40 and cavity 41 of said slide valve, and the brake cylinder release passages 48, 49. Since brake cylinder pressure in the interlock chamber 141 acting on the diaphragm 143 through the pusher stem 147 opposes brake pipe pressure in the chamber 125, and since through previously described operation of the service valve diaphragm stack brake cylinder pressure decreases in proportion to the degree of increase in brake pipe pressure, it will be apparent that, by virtue of the interlock device 142, movement of the reduction insuring slide valve 126 to intermediate position will be delayed until the combined effect of decreasing brake cylinder pressure in interlock chamber 141 and constant control reservoir pressure in the chamber 124 on the diaphragm 122 is overcome by the opposing effect of increasing brake pipe pressure in chamber 125, pressure in the chamber 128, and action of the regulating spring 128; it being noted that the interlock diaphragm 143 is of such area relative to that of the reduction insuring diaphragm 122 that the slide valve 126 will assume its intermediate position when brake cylinder pressure has reduced to a chosen value, such as about 2 p. s. i., at which time brake pipe pressure in the chamber 125 will have increased to within about 3 p. s. i. of control reservoir pressure in the chamber 124, i. e., within about 3 p. s. i. of the normal full charge value of brake pipe pressure.

Even under the extreme conditions heretofore assumed, it has been found by actual test that prior to this movement of the slide valve 126 to its intermediate position, brake pipe pressure will have been increased sufficiently so that the combined effect of such pressure in the chamber 86 of the quick service valve device 11 and action of the spring 89 will have overcome the opposing effect on the diaphragm 83 of auxiliary reservoir pressure in the chamber 85 and caused the slide valve 87 to be shifted to normal position. In other words, the interlock device 142 cooperates with the improved reduction insuring valve device 18 so as to positively delay movement of the reduction insuring slide valve 126 to its intermediate position until brake pipe pressure will have increased sufficiently to have caused the quick service slide valve 87 to be previously shifted to its normal position, for thereby positively assuring against the possibility of an undesired quick service reduction in brake pipe pressure when the slide valve 126 reaches its intermediate position.

With the slide valve 126 in its intermediate position, fluid under pressure previously bottled up in the quick service volume 92 and chamber 128 will be vented into the substantially vented brake cylinder device 5 via the choke fitting 133; and since the interlock chamber 141 is also open to the brake cylinder device 5 by way of the cavity 138 and port 136, some backflow of this fluid under pressure into said chamber 141 will "feather" the action of the slide valve 126 by limiting the rate of release of fluid under pressure from said volume and chamber 128 to the rate at which fluid is released from the brake cylinder device 5 by way of the release chokes 50, 51 for thereby preventing a momentary increase in brake cylinder pressure, this desirable result having been proved in actual tests of the improved apparatus.

As fluid under pressure is released from the brake cylinder device 5 by way of the release chokes 50, 51, it will be correspondingly released from the quick service volume 92, chamber 128 and interlock chamber 141. When the brake cylinder device 5, quick service volume 92 and chambers 128, 141 are substantially devoid of fluid under pressure, the bias spring 144 will shift the diaphragh 143 to its normal position, for thereby completely relieving the thrust it had therefore operatively exerted on the pusher stem 147 and thus enabling the diaphragm 122 to be deflected sufficiently to carry the slide valve 126 to its previously defined normal position; it being noted that at this time brake pipe pressure will have been restored to a value about 2.1 p. s. i. below control reservoir pressure.

With the slide valve 126 in normal position, the cavity 138 will connect the interlock chamber 141 to the atmosphere vent port; the cavity 134 will connect the quick service volume 92 and chamber 128 to both brake cylinder ports 136, 135; and fluid under pressure will be vented from the charging valve chamber 73 by way of the vented chamber 128 causing the charging slide valve 77 to be shifted to its charging position, in which brake pipe pressure will equalize with control reservoir pressure and auxiliary reservoir pressure via the respective communications previously described.

It will now be noted that during a brake application, the improved reduction insuring valve device 18 operates to assure that brake pipe pressure will be reduced below control reservoir pressure at least a chosen degree, illustratively assumed as 6 p. s. i., corresponding to that necessary to effect a minimum brake application of a selected degree. During release of a brake application, the interlock device 142 delays return of the reduction insuring slide valve 126 to its intermediate position until brake cylinder pressure has been reduced to a value at which brake pipe pressure will have been restored to a value sufficient to have theretofore caused the quick service slide valve 87 to be shifted to normal position and thus positively prevent the possibility of an undesired venting of the brake pipe into the brake cylinder device 5. After the reduction insuring slide valve 126 moves to intermediate position and thus causes venting of the quick service volume 92, the brake controlling valve device 2 will be conditioned to enable a quick service reduction in brake pipe pressure to be effected if and when the operator subsequently effects a reduction in brake pipe pressure at the locomotive sufficient to cause operation of the quick service slide valve 87 to its quick service position, in the manner previously explained.

From the foregoing, it will be appreciated that the operator may so vary brake pipe pressure at the locomotive as to effect variations in brake pipe pressure at a respective car between the limits of 6 p. s. i. below control reservoir pressure and about 3 p. s. i. below control reservoir pressure on such car without causing a quick service reduction in brake pipe pressure and without causing the charging slide valve 77 to move to charging position; and hence by varying brake pipe pressure on such car within said limits the operator may effect corresponding variations in the degree of brake application, down to full release. In other words, the operator may release and reapply brakes to a degree less than that corresponding to the preselected degree of minimum brake application; this being desirable for enabling brakes to be very lightly applied, as while descending a long, slight grade, it being understood that the diaphragm stack of the service valve device 8 operates to provide in the brake cylinder device 5 fluid at a pressure substantially proportionate to the degree to which brake pipe pressure is reduced below control reservoir pressure.

*Summary*

It will now be seen that the improved brake apparatus embodies a novel interlock device 142 which cooperates with an improved reduction insuring valve device 18 to delay movement of the slide valve 126 of the latter device to intermediate position, in which the quick service volume 92 is vented into the brake cylinder device 5, until brake cylinder pressure has been reduced to a value at which brake pipe pressure will have been restored sufficiently relative to auxiliary reservoir pressure to have previously caused the quick service slide valve 87 to be moved from its quick service position to its normal position for cutting off the brake pipe from said quick service volume. And it will be seen that by thus assuring that the quick service slide valve 87 will assume its normal position before the reduction insuring slide valve 126 moves to its intermediate position, even under the extreme conditions hereinabove illustratively assumed, an undesired quick service reduction in brake pipe pressure during a release of brakes will be positively prevented.

Having now described the invention, what I claim as new and desire to secure by Letters Patent, is:

1. In a fluid pressure apparatus, the combination of a brake pipe normally charged with fluid under pressure, a brake cylinder, means defining a quick service communication via which fluid under pressure may be locally withdrawn from the brake pipe, quick service effecting means responsive to an initial slight reduction in brake pipe pressure below normal full charge value to connect the brake pipe with the quick service communication for effecting a local withdrawal of fluid under pressure from the brake pipe, valve means normally in one position for opening the quick service communication and responsive to a certain reduction in brake pipe pressure, greater than said initial slight reduction, to move to another position to close said quick service communication for terminating such withdrawal of fluid under pressure from the brake pipe, means defining a chamber, and fluid pressure loading means for exerting on said valve means a force corresponding to the degree of pressurization of said chamber for opposing operation of said valve means from its said other position toward its said one position, said valve means being operative in its said one position to open said chamber to the atmosphere and operative in its said other position to open said chamber to the brake cylinder, whereby operation of said valve means from its said other position toward its said one position will be delayed until brake pipe pressure has been increased to a selected value higher than that which resulted from said certain reduction.

2. In a fluid pressure brake apparatus, the combination of a brake pipe normally charged with fluid under pressure, a brake cylinder, a quick service volume independent of said brake cylinder, a normally open communication connecting said quick service volume with said brake cylinder, quick service effecting means responsive to an initial slight reduction in brake pipe pressure below normal full charge value to connect the brake pipe to the quick service volume and to said communication for effecting a local withdrawal of fluid under pressure from the brake pipe, means defining a chamber, valve means normally in one position and responsive to a chosen reduction in brake pipe pressure, greater than said initial slight reduction, to move to another position to open said chamber to said brake cylinder and also close said communication for terminating such withdrawal of fluid under pressure from the brake pipe, fluid pressure responsive means subject to the fluid pressure in said chamber and exerting on said valve means a loading force corresponding to the degree of pressurization of said chamber and which force opposes operation of said valve means from its said other position toward its said one position, and one-way flow means for permitting flow of fluid under pressure from said chamber to said brake cylinder in by pass of said valve means and preventing such by-passing flow in the reverse direction.

3. In a fluid pressure brake apparatus, the combination of a brake pipe normally charged with fluid under pressure; a brake cylinder; a quick service volume independent of the brake cylinder; a restricted communication connecting said quick service volume with said brake cylinder, quick service effecting means responsive to an initial slight reduction in brake pipe pressure below normal full charge value to connect the brake pipe to said quick service volume for effecting a local withdrawal of fluid under pressure from the brake pipe; means defining a chamber; means comprising valve means, a plurality of movable abutments arranged in a stack for controlling positioning of said valve means, and bias means for urging said stack and valve means to a normal position for opening said communication and venting said chamber, the pressure of fluid in said chamber acting on said stack in opposition to brake pipe pressure, said stack being responsive to a chosen reduction in brake pipe pressure, greater than said initial slight reduction, to move said valve means to another position to close said communication and also open said chamber to the brake cylinder, said stack being responsive to a subsequent increase in brake pipe pressure to a certain value higher than that resulting from said chosen reduction and less than said normal full charge value to move said valve means to a position intermediate its said other position and one position to reopen said communication for venting said quick service volume into said brake cylinder while maintaining said chamber connected to the brake cylinder; and service valve means responsive to a reduction in brake pipe pressure in excess of a preselected degree, greater than that corresponding to said slight reduction and less than that corresponding to said chosen reduction, to provide in said brake cylinder fluid at a pressure corresponding substantially to the degree of such reduction in brake pipe pressure and responsive to a subsequent increase in brake pipe pressure to release fluid under pressure from said brake cylinder to a degree corresponding to the degree of increase in brake pipe pressure.

4. In a fluid pressure brake apparatus, the combination of a normally charged brake pipe, a normally charged control reservoir, a normally charged auxiliary reservoir, a brake cylinder, a quick service volume independent of said brake cylinder, quick service effecting means responsive to an initial slight reduction in brake pipe pressure below auxiliary reservoir pressure to connect the brake pipe with the quick service volume for effecting a local quick service reduction in brake pipe pressure and responsive to subsequent substantial equalization of brake pipe and auxiliary reservoir pressures to cut off said brake pipe from the quick service volume, check valve means for preventing flow from said auxiliary reservoir to said brake pipe and permitting flow in the reverse direction, means defining a first chamber, means defining a second chamber constantly open to the quick service volume, first valve means subject to control reservoir pressure and to pressure of fluid in said first chamber in opposition to a spring bias and to brake pipe pressure and to pressure of fluid in said second chamber, said first valve means normally being held by its spring bias in a normal position for opening said quick service volume to said brake cylinder and venting said first chamber, said first valve means being operable by control reservoir pressure responsively to a chosen reduction in brake pipe pressure, greater than said slight reduction, to move to another position for closing off said quick service volume from said brake cylinder and opening said first chamber to the brake cylinder, said first valve means being responsive to a subsequent increase in brake pipe pressure to a certain value, greater than that which resulted from said chosen reduction and less than its normal full charge value, to move to a position intermediate its said other position and normal position for releasing fluid under pressure from said second chamber and quick service volume into said brake cylinder while continuing to maintain the first chamber open to the brake cylinder, said first valve means thereafter being responsive to a greater increase in brake pipe pressure to return to its normal position, and second valve means subject to control reservoir pressure in opposition to brake pipe pressure and brake cylinder pressure, said second valve means being operative while the brake pipe is charged to its normal full charge value to maintain the brake cylinder open to atmosphere, and responsive to a reduction in brake pipe pressure, greater than said slight reduction, to effect supply of fluid under pressure from said auxiliary reservoir to said brake cylinder and responsive to a subsequent increase in brake pipe pressure to release fluid under pressure from said brake cylinder to a degree corresponding substantially to the degree of such increase in brake pipe pressure.

5. The combination according to claim 4, including charging valve means having a control chamber and responsive to release of fluid under pressure from said control chamber to open said auxiliary reservoir and control reservoir to the brake pipe and responsive to pressure of fluid in said control chamber in excess of a small value to close off said auxiliary reservoir and control reservoir from the brake pipe, and wherein said first valve means in its said normal position opens said control chamber to said quick service volume and in its said other and intermediate positions opens said control chamber to said auxiliary reservoir.

References Cited in the file of this patent

UNITED STATES PATENTS

| 1,693,943 | Thomas | Dec. 4, 1928 |
| 2,016,411 | Cook | Oct. 8, 1935 |
| 2,058,012 | Torayre | Oct. 20, 1936 |
| 2,376,680 | Gallusser | May 22, 1945 |
| 2,672,376 | Cook | Mar. 16, 1954 |

FOREIGN PATENTS

| 668,122 | Great Britain | Mar. 12, 1952 |